Figure 1:
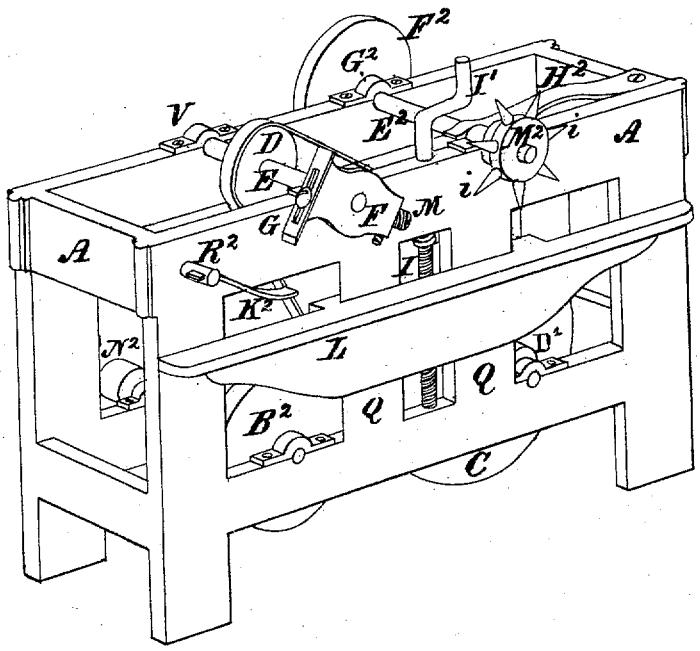

3 Sheets--Sheet 1.

H. B. SMITH.
Molding-Machines.

No. 5,535. Reissued August 19, 1873.

Witnesses.

Wm. H. Rowe

J. Snowden Bell.

Inventor.

Hezekiah B. Smith

By Chas. B. Collier His Attorney.

AM. PHOTO-LITHOGRAPHIC CO. N.Y. (OSBORNE'S PROCESS)

H. B. SMITH.
Molding-Machines.

No. 5,535. Reissued August 19, 1873.

Witnesses. Inventor.

Wm. H. Rowe,

J. Snowden Bell.

Hezekiah B. Smith
By Chas. B. Collier
his attorney

AM. PHOTO-LITHOGRAPHIC CO. N.Y. (OSBORNE'S PROCESS.)

H. B. SMITH.
Molding-Machines.

No. 5,535. Reissued August 19, 1873.

Witnesses.

Wm. H. Rowe,

J. Snowden Bell.

Inventor.

Henrikah B. Smith
by Chas. B. Collier
his Attorney.

AM. PHOTO-LITHOGRAPHIC CO. N.Y. (OSBORNE'S PROCESS)

UNITED STATES PATENT OFFICE.

HEZEKIAH B. SMITH, OF SMITHVILLE, NEW JERSEY.

IMPROVEMENT IN MOLDING-MACHINES.

Specification forming part of Letters Patent No. 20,824, dated July 6, 1858; extended seven years; reissue No. 5,535, dated August 19, 1873; application filed June 7, 1873.

*To all whom it may concern:*

Be it known that I, HEZEKIAH B. SMITH, formerly of Lowell, in the county of Middlesex and State of Massachusetts, but now of Smithville, in the county of Burlington and State of New Jersey, have invented certain new and useful Improvements in Molding-Machines, of which the following is a specification:

The object of the first part of my invention is to obviate risk of accident and to facilitate keeping the cutters in proper condition for service, by properly balancing the revolving cutter-heads used in planing moldings; and my improvement consists in combining with a rotating cutter-head an adjustable cutter and an adjustable counter-balance, the position of which can be regulated so as to accurately compensate wear of the cutter.

By reason of the great velocity with which this class of cutters is required to be operated, only one cutter can be economically used upon each cutter-head, and, in order to finish the moldings smooth, it is of course necessary that the revolving cutter-heads should be accurately balanced. Moreover, the life and limb of the operator are endangered by a failure to properly balance the cutter-heads, numerous accidents of a more or less disastrous character having occurred by the action of the centrifugal force developed by the rapid rotation of unbalanced cutters. The cutters require to be frequently ground and set, which can be readily and conveniently done when only one cutter is employed, and inasmuch as the frequent grinding of the cutters correspondingly lightens them, the necessity of proper means for maintaining them in balance becomes still more apparent.

Previous to my invention it had been the practice to attach two cutters to the cutter-head, and this head to its shaft, and after ascertaining the locality of the preponderance of weight upon the periphery of the cutter-head by applying it upon a level straight edge to remove the superfluous metal by a file or drill, this tedious operation having to be repeated whenever the cutters were ground. When the cutters became so much worn by repeated grinding that new ones had to be applied, it would be found that the removal of metal from the cutter-head had made it too light to balance the new cutters, and pieces of lead had to be screwed on the cutter-head to replace the metal removed, these being in turn cut away, as before, whenever the new cutters were ground.

My improvement supersedes this tedious process by enabling the cutter to be kept in accurate equilibrium by a simple adjustment of the counter-balance.

The object of the next part of my invention is to provide suitable means for the vertical movement and adjustment of the table or platen upon which the stuff is fed to the cutter, so that the position of the same may be accurately adjusted to suit different thicknesses of stuff; and my improvement consists in combining with a stationary frame and guides or ways a vertically-moving table or platen and an elevating-screw working in a nut attached to the table, so that the table or platen may be raised, lowered, and maintained in desired position in a vertical plane, to suit the thickness of the molding to be operated upon.

In molding-machines as constructed prior to my invention, the table was raised and lowered by means of two screws situated at or near its respective ends, without guiding mechanism to cause it to retain a horizontal position under all circumstances, and being dependent to that end upon the skill of the operator, besides involving slower and more careful manipulation than is required in the use of my improvement. In other cases the table was moved in an inclined plane by means of a screw, one end only of the table being acted upon—an arrangement which, it is obvious, would not answer the requirements of practical use.

Figure 2:
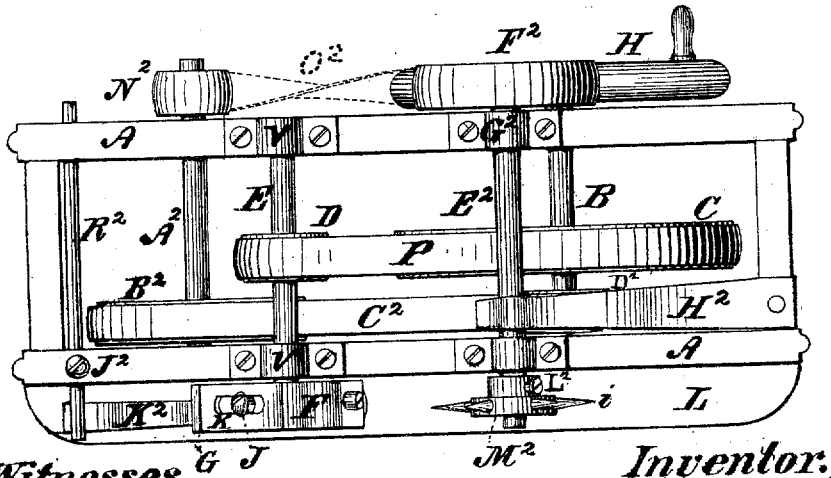
Figure 3:
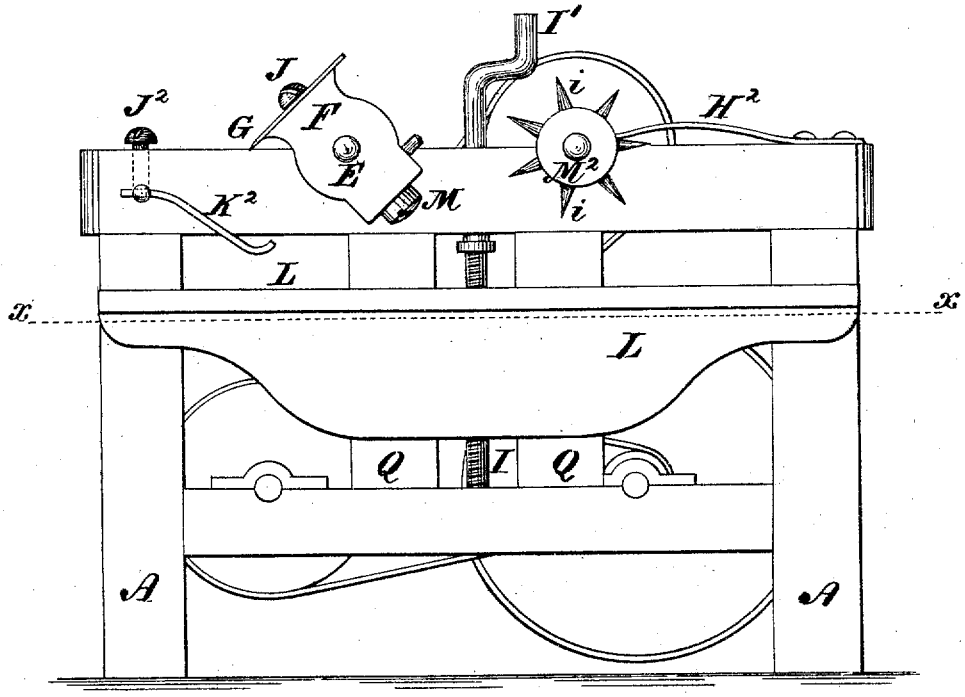
Figure 4:
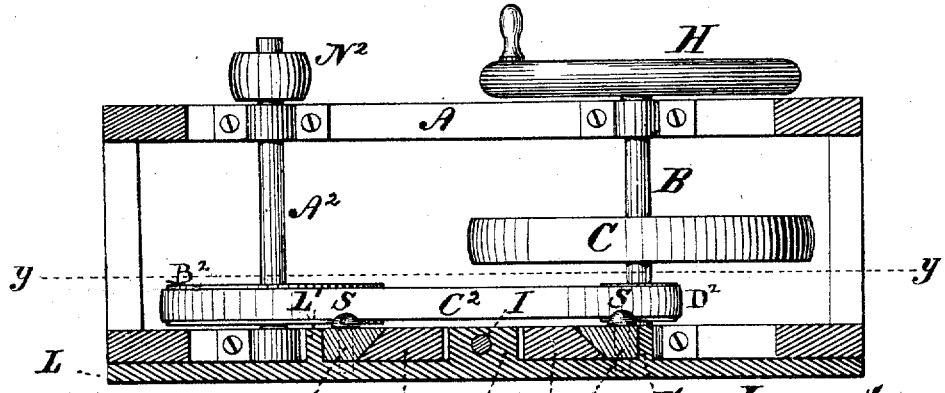
Figure 5:
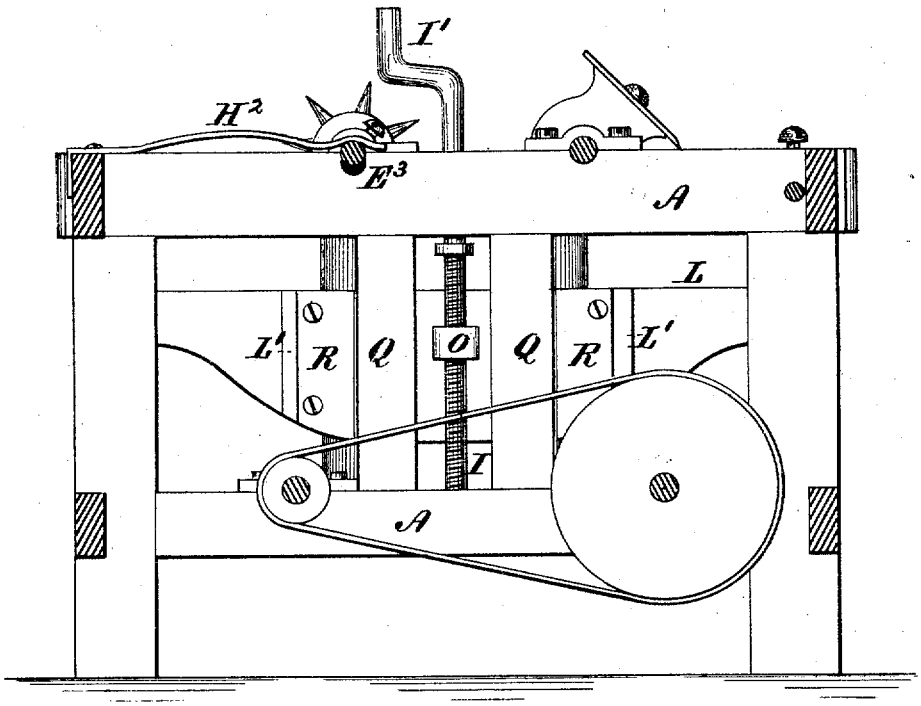
Figure 6:
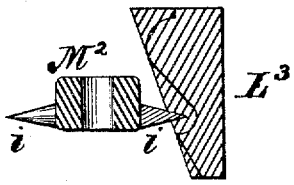
Figure 7:
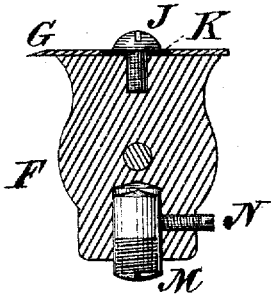

In the accompanying drawings, Figure 1 is a view in perspective of a molding-machine embodying my improvements; Fig. 2, a plan or top view of the same; Fig. 3, a side view of the same; Fig. 4, a horizontal section of the same at the line *x x* of Fig. 3; Fig. 5, a vertical section of the same at the line *y y* of Fig. 4; Fig. 6, a transverse section of the spur feed-wheel and the beveled piece upon which the molding is to be formed; and Fig. 7, a vertical section of the balanced cutter-head.

A substantial frame, A, serves as the basis of attachment for the different members. A driving-shaft, B, is mounted in bearings properly secured upon the frame, and carries a drive-wheel, H, to which power is applied from any suitable prime mover. A cutter-shaft, E, mounted in bearings V at or near the top of the frame A, carries a cutter-head, F, and small pulley D, and is driven at a rapid rate of speed by means of the belt P, which passes around the pulley D and the larger pulley C secured to the driving-shaft B. The cutter-head F is firmly secured upon the cutter-shaft E near one of its ends, being properly faced off on one side to receive the cutter G, which is secured upon it by a screw, J, passing through a longitudinal slot, K, in the cutter. When the cutter requires grinding it can be readily removed for that purpose by the withdrawal of the screw, and the slot K enables the proper adjustment to be made in replacing it. The side of the cutter-head opposite to the cutter is drilled and threaded to receive the screw counter-balance M, which consists of a cylindrical metallic plug threaded to fit the screw formed in the cutter-head, and consequently capable of being moved toward or from the center thereof, as may be required to counterbalance the cutter G, this method of adjustment enabling the operator readily and accurately to balance the cutter as the same becomes worn, or when a new one is inserted. To secure the counterbalance when adjusted in position I provide a set-screw, N, which is tapped into the cutter-head F, and can be screwed down upon the counter-balance M to clamp it in any desired position. The stuff to be worked is fed to the cutter over a table or platen, L, which is placed on one side of the frame A in convenient juxtaposition to the cutter-head, and is moved up and down in a vertical plane upon ways or guides Q Q firmly secured to the frame to suit the thickness of the stuff to be worked. The ways or guides are beveled or mitered, as shown in Fig. 4, and for convenience in taking up lost motion. To compensate wear of the table or platen upon the guides, a gib or liner, R, may be interposed between the face of the guide Q and the inwardly-projecting flange $L^1$ of the platen, being secured to the table by bolts or screws S. The gib or liner, which can be used upon either one or both of the guides, as preferred, can be set up by the screws S as the table and guide become worn, and the relative adjustment thereof be properly maintained. A nut, O, Figs. 4 and 5, is secured to or formed upon the inside of the table L near its center, and about midway between the flanges $L^1$, in which nut a screw, I, works. This screw turns in proper bearings in the frame A, and is provided with a handle or crank, I′, by which it can be operated.

By this arrangement it will be seen that the table can be readily and conveniently adjusted at different heights, as required to suit the thickness of the stuff to be worked, and by the use of the screw I and guides Q Q the table will maintain a horizontal position under all circumstances, and can be moved up and down without cramping or binding.

The stuff is fed to the cutter by means of a spur feed-wheel, $M^2$, to be presently described. This feed-wheel is secured upon a shaft, $E^2$, carrying a pulley, $F^2$, which is driven by a crossed belt, $O^2$, passing around a smaller pulley, $N^2$, on a counter-shaft, $A^2$. The counter-shaft $A^2$ carries a larger pulley, $B^2$, and is driven by an open belt, $C^2$, passing around the pulley $B^2$ and around a smaller pulley, $D^2$, on the drive-shaft B. The relative diameters of the several pulleys are suitably proportioned to impart a slow rate of speed to the shaft $E^2$ and feed-wheel $M^2$, while the drive-shaft revolves with great rapidity. The spur feed-wheel $M^2$ is provided with a series of long, slim, sharp-pointed teeth, *i i*, which may be of any desired shape, and set at any angle found most suitable. When the feed-wheel is put in revolution the teeth *i i* deeply enter that portion of the wood which is afterward to be removed or channeled out by the cutter, and force the stuff along the table or platen L to the cutter. The wheel $M^2$ is adjustable upon its shaft, being secured thereon by the screw $L^2$, so that it can be moved longitudinally and adjusted to engage in such portion of the width of the stuff as is found to be most advisable.

In order to economize material as well as to save work it is desirable that the pieces for the moldings should be sawed out as near the desired shape of the molding as is practicable. (See Fig. 6, in which $L^3$ represents a section of a piece of stuff in which a molding is to be worked.)

The longitudinal adjustment of the spur feed-wheel upon its shaft enables the operator to set it so that its points shall enter such portion of the wood as is to be channeled out most deeply, and, therefore, to obtain a firm hold upon the stuff without injuring or disfiguring it.

One end of the feed-wheel shaft $E^2$ is kept in position by a cap, $G^2$; and the other end of the shaft is free to rise and fall in a vertical slot, $E^3$, Fig. 5, in the frame A, being held down elastically by an adjusting-spring, $H^2$, of proper tension, so that the feed-wheel can accommodate itself to any inequalities upon the stuff or the surface of the table.

In order to press down and hold the stuff upon the table L while the cutter is shaping the molding, I provide a pressure-guide, $K^2$, consisting of a plate-spring adjustable longitudinally upon a shaft, $R^2$, which, in turn, is made vertically adjustable in the frame A, near the end thereof farthest from the feed-wheel, by means of a screw, $J^2$. The pressure-guide, which can be readily adjusted, bears upon, without marring, the finished portion of the molding, and properly steadies the stuff upon the table during the operation.

I am fully aware of the English patent No. 12,735, of 1849, in which a vertically-adjustable table or platen is described and shown, the vertical adjustment being accomplished by means of two screws, one of which is located at or near each end of said table, both to be operated whenever the table is to be adjusted.

In my invention only one screw is used to adjust the table, which screw is so arranged, with relation to the table and the guides upon the frame of the machine, that both ends of the table are simultaneously adjusted to the same height, relatively, with the cutter, which is not the case in the English patent above cited, as two screws have to be operated, requiring double the time, and necessitating very accurate manipulation on the part of the operator, as, in order to obtain an accurate adjustment, two measurements—one at each end of the table—will be required; while, with my improvement, only one screw has to be operated, and only one point of measurement is required to effect the adjustment; and I lay no claim to the construction as shown in said English patent, No. 12,735.

Moreover, the beveled guards which I provide upon the frame are essential to preserve the horizontality of the table, and prevent the cramping or binding of the same in its movements. Such a device is not shown in the patent referred to, nor has it been employed or suggested, to the best of my knowledge, prior to my invention.

I claim as my invention—

1. The combination of the cutter-head, the adjustable cutter, the screw counter-balance, and the set-screw for securing the same in position, substantially as set forth.

2. In a molding - machine, the combination of a vertically-moving feed-table or platen, L, the screw I, for raising and lowering the table, acting thereon at or near its center, and guides or ways Q Q upon the frame of the machine, upon which the table moves, these members being combined for joint operation, so that the table shall maintain a horizontal position under all circumstances, substantially as set forth.

HEZEKIAH B. SMITH.

Witnesses:

D. L. COLLIER,

WM. B. DAYTON.